F. H. FRIES.
CONFECTION.
APPLICATION FILED OCT. 17, 1916.
1,267,320.
Patented May 21, 1918.
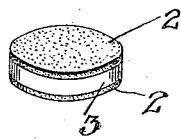
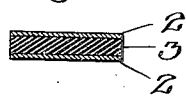
Inventor
Francis H. Fries
By Mason Fenwick Lawrence,
Attorneys

UNITED STATES PATENT OFFICE.

FRANCIS HENRY FRIES, OF WINSTON-SALEM, NORTH CAROLINA, ASSIGNOR TO VENOLA COMPANY, OF WINSTON-SALEM, NORTH CAROLINA, A CORPORATION OF NORTH CAROLINA.

CONFECTION.

1,267,320.  Specification of Letters Patent.  Patented May 21, 1918.

Application filed October 17, 1916. Serial No. 126,181.

*To all whom it may concern:*

Be it known that I, FRANCIS H. FRIES, a citizen of the United States, residing at Winston-Salem, in the county of Forsyth and State of North Carolina, have invented certain new and useful Improvements in Confections; and I do hereby declare the following to be a full, clear, and exact description of the invention, such as will enable others skilled in the art to which it appertains to make and use the same.

This invention relates to confections.

It is an object of the present invention to provide a new article of confection, and the invention consists essentially of an article of confection comprising a stratum, form, core, or body in the nature of a chewing gum, and having on its opposite faces layers of sugar, the whole being compressed to form a substantially integral piece of confection.

Figure 1 is a perspective view of the tablet, and

Fig. 2 is a longitudinal vertical section through the tablet.

The present confection consists of a compressed piece of chewing gum provided on its opposite sides with layers of suitable material preferably sugar, it being understood that the article of confection may be manufactured in various shapes and sizes, and proportions, being shown in Fig. 1 of the drawing as substantially elliptical in form.

For purposes of illustration the article of confection is shown, as comprising a central body or core portion 3 of chewing gum, having on its upper and lower faces 2—2 suitable layers of sugar or other substance, the whole being rendered substantially integral by the application of pressure so that the finished confection is salable in the form of a tablet.

Obviously the confection may be given various flavors during the process of manufacture and if desired may be variously colored in any obvious and well known manner.

What is claimed as new is:

1. An article of confection comprising a central sheet of chewing gum and a layer on each side of the gum sheet, composed of powdered sugar, the whole being rendered integral by pressure.

2. An article of confection comprising a central sheet of chewing gum and a thick layer on each side of the gum sheet, composed of powdered sugar, the whole being rendered integral by pressure.

In testimony whereof I affix my signature in presence of two witnesses.

FRANCIS HENRY FRIES.

Witnesses:
FRED. SHEETZ,
J. F. BROWER, Jr.